United States Patent [19]

Cramer

[11] 4,097,878
[45] Jun. 27, 1978

[54] UNDERWATER HOUSING FOR PHOTOGRAPHIC CAMERAS

[76] Inventor: Alfons Cramer, Schutzenhausstrasse 13, Oetwil am See, Switzerland

[21] Appl. No.: 757,176

[22] Filed: Jan. 6, 1977

[30] Foreign Application Priority Data

Feb. 6, 1976 Switzerland .................... 1481/76

[51] Int. Cl.² ........................................... G03B 17/08
[52] U.S. Cl. ................................................... 354/64
[58] Field of Search .......................................... 354/64

[56] References Cited

U.S. PATENT DOCUMENTS

| 3,019,715 | 2/1962 | Arnold et al. | 354/64 |
| 3,241,467 | 3/1966 | Young | 354/64 |
| 3,412,661 | 11/1968 | Soumar | 354/64 |
| 3,786,734 | 1/1974 | Long et al. | 354/64 |

FOREIGN PATENT DOCUMENTS 502,831 12/1954 Italy ........................ 354/64

Primary Examiner—Donald A. Griffin
Attorney, Agent, or Firm—Ladas, Parry, Von Gehr, Goldsmith & Deschamps

[57] ABSTRACT

An underwater housing for photographic cameras, comprising a camera housing portion, a closure portion detachably connected with the camera housing portion, actuation elements for operating the camera penetrating through the wall of the camera housing portion. One of the actuation elements comprises a pusher arrangement for releasing the camera shutter which incorporates a pressure pin and a seal formed of elastomeric material inserted into an opening in the wall of the camera housing portion. The seal is provided with a head, a ring flange and a plug elastically expansible in lengthwise direction. The plug and the ring flange extend so as to protrude concentrically with respect to one another from the underside of the head. A peripheral groove is formed at the outer surface of the ring flange into which protrudes the wall portion of the camera housing portion surrounding the opening. A blindhole bore extends from the upper side of the head into the plug, and in the blindhole bore there is held the pressure pin.

27 Claims, 11 Drawing Figures

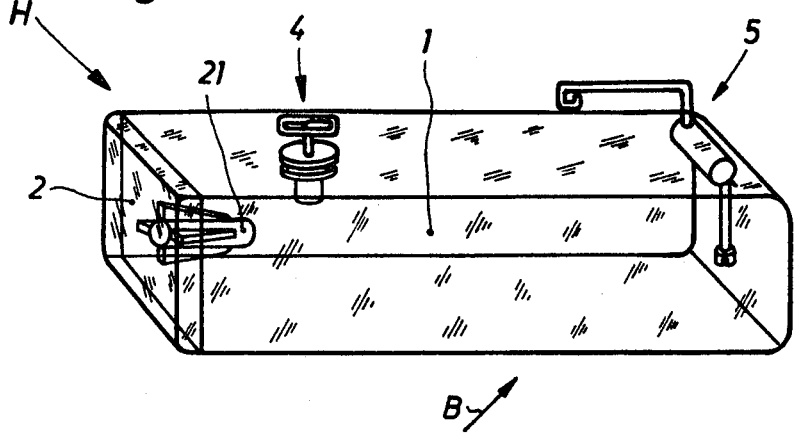
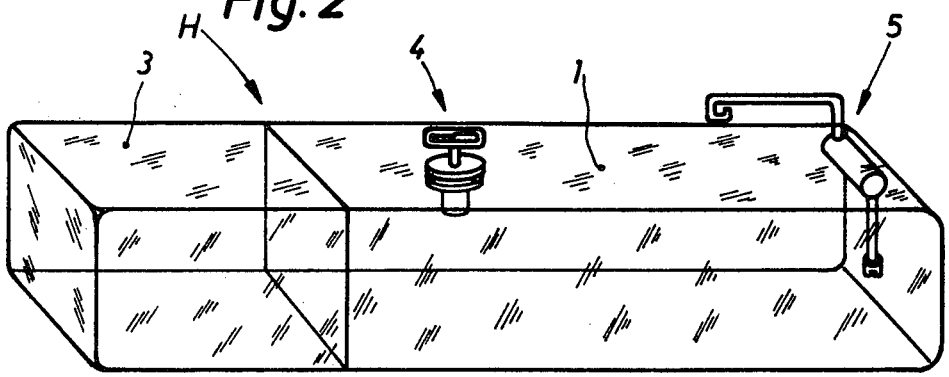

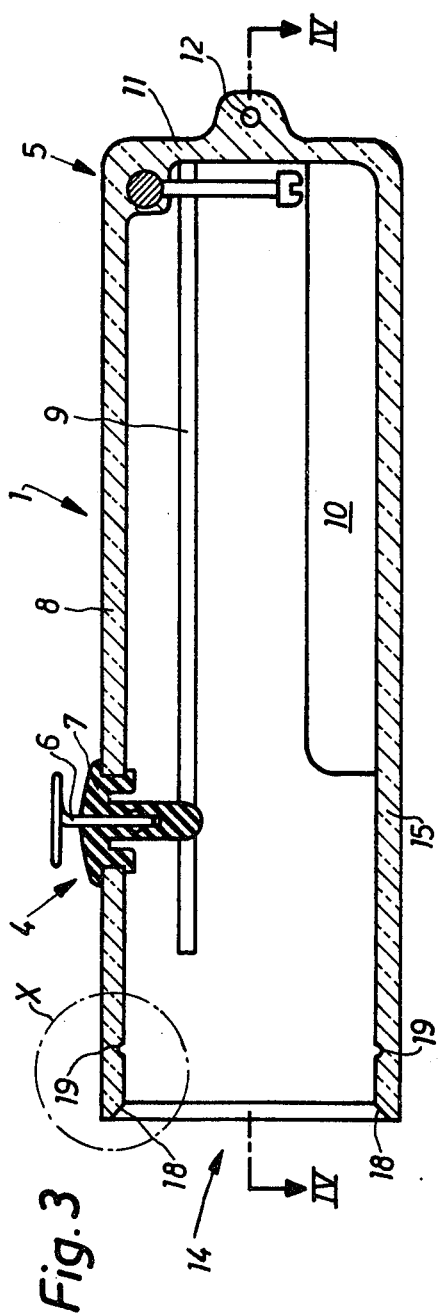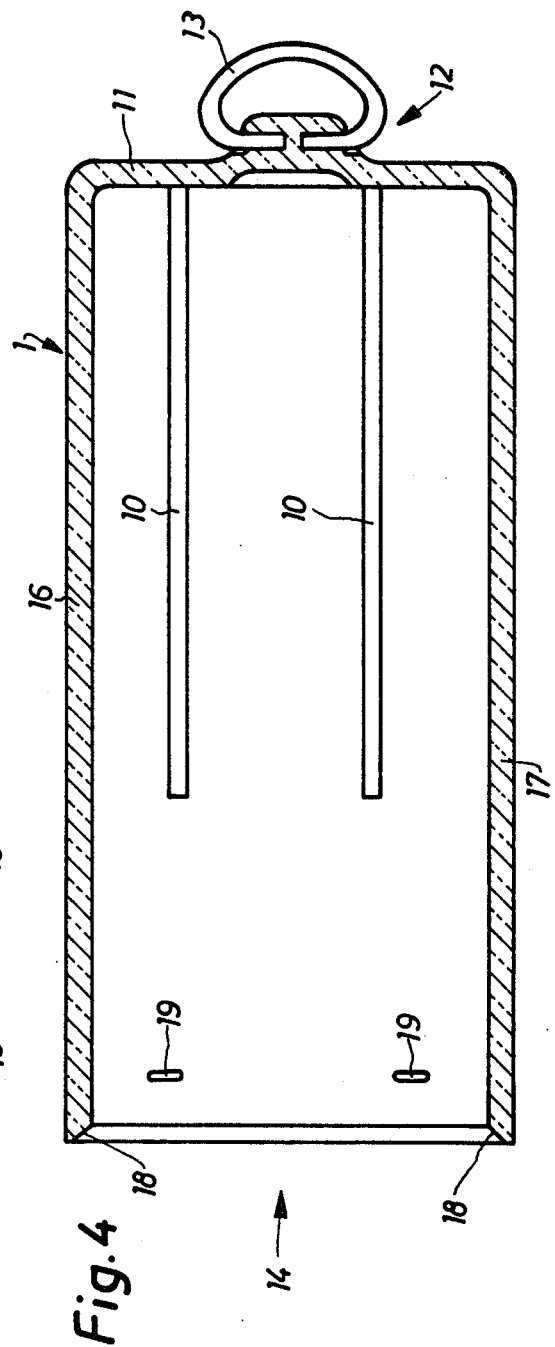

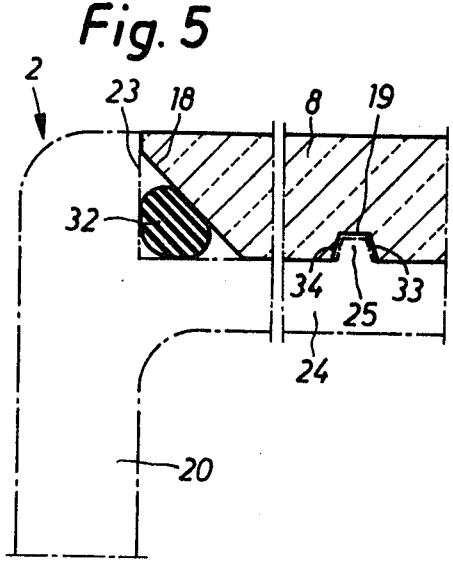
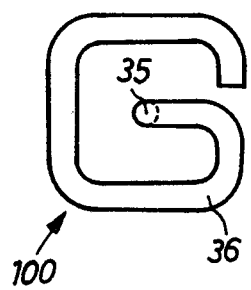
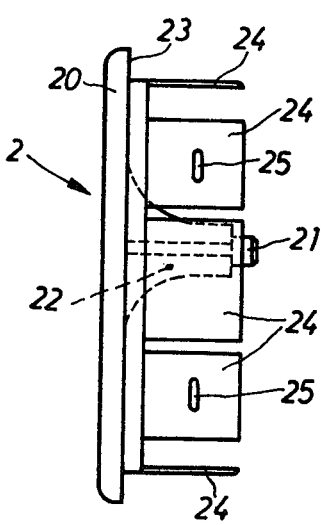
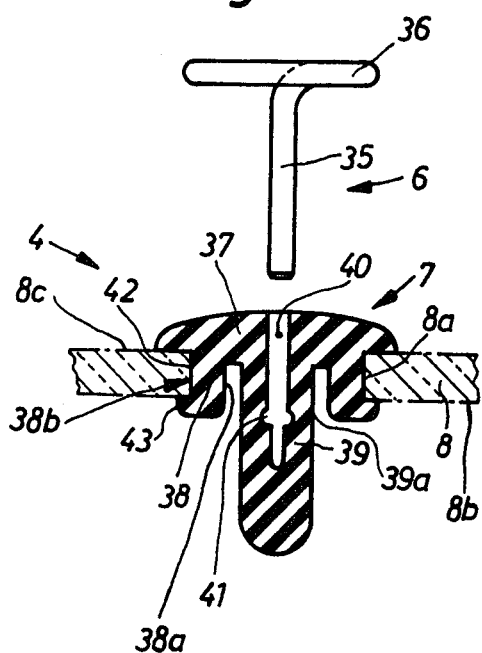

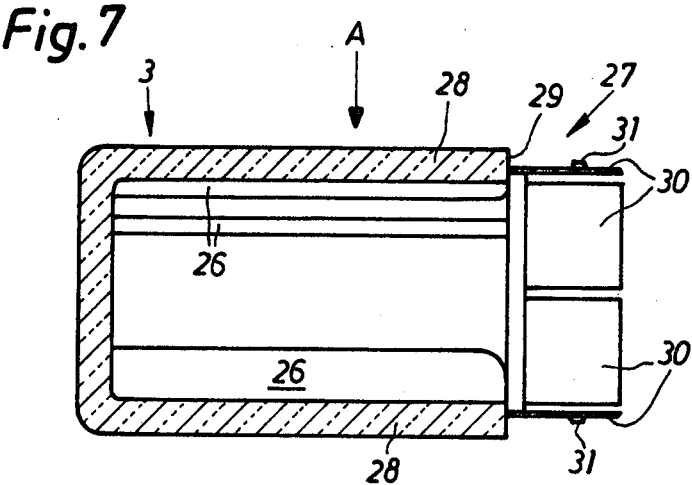
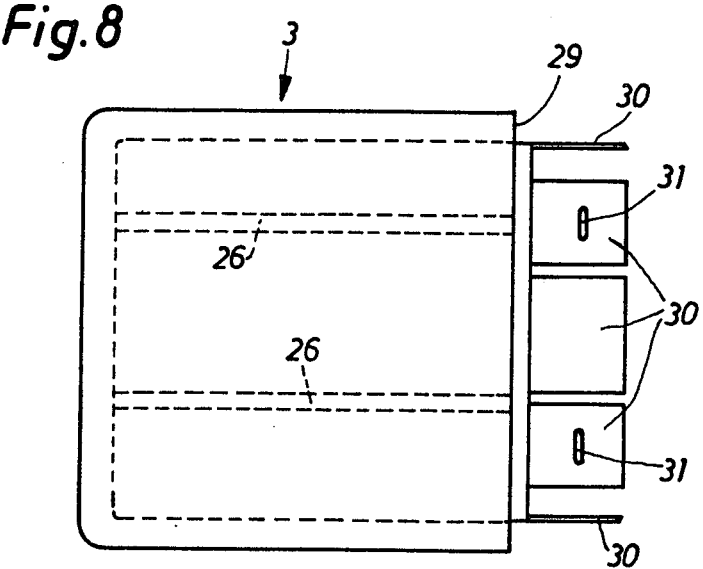

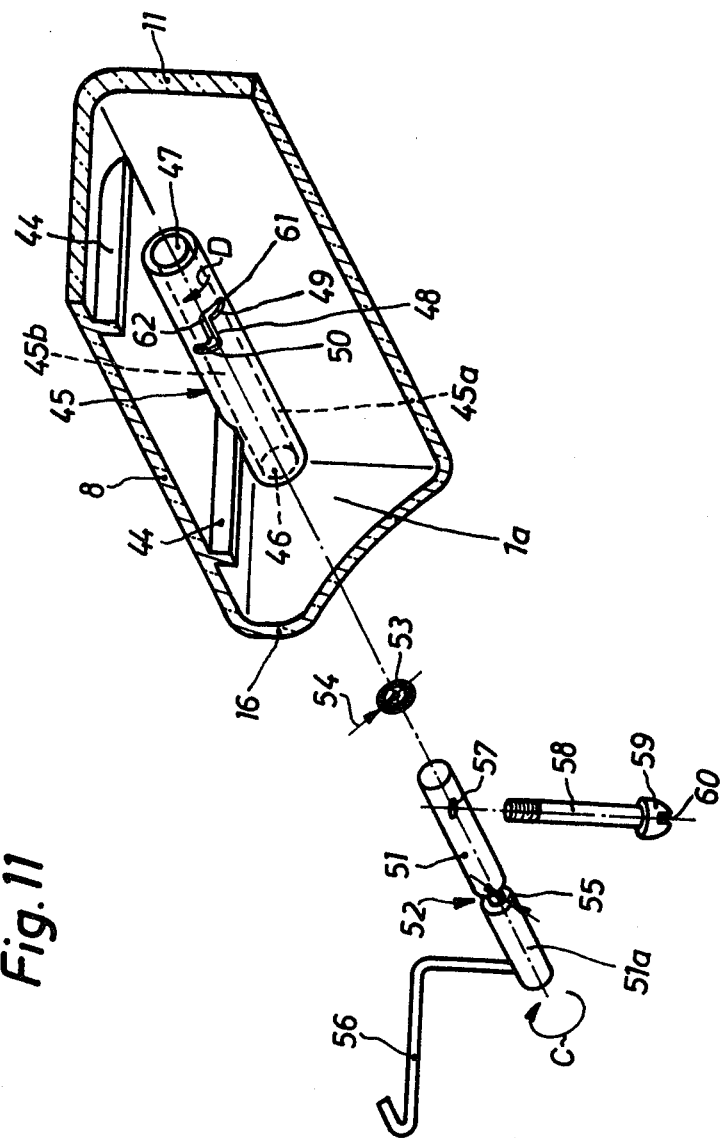

UNDERWATER HOUSING FOR PHOTOGRAPHIC CAMERAS

BACKGROUND OF THE INVENTION

The present invention relates to a new and improved construction of underwear housing for a photographic camera.

An underwater housing of the aforementioned type has imposed thereon the requirement that it be watertight so that no water can penetrate into the internal compartment or chamber of the housing due to the effects of the water pressure present at a predetermined depth, to thereby safeguard against damaging photographic equipment contained within the housing. Additionally, it is necessary to seal in a watertight fashion the actuation elements extending through the housing wall and used for actuating the camera.

Heretofore known underwater housings for photographic cameras are extremely complicated in construction and thus expensive, so that a person who only occasionally dives is unable to afford to purchase such equipment. Additionally, the need exists for constructing an underwater housing such that it can also accommodate a conventional camera for photographic purposes on land.

SUMMARY OF THE INVENTION

Hence, it is a primary object of the present invention to provide a new and improved construction of an underwater housing for a camera which is not associated with the aforementioned drawbacks and limitations of the prior art proposals.

Another and more specific object of the present invention aims at overcoming the previously indicated drawbacks and providing an underwater housing for photographic equipment which satisfies the indicated requirements.

Now in order to implement these and still further objects of the invention, which will become more readily apparent as the description proceeds, the underwater housing of the present development is manifested by the features that there is provided a camera housing portion, a closure portion detachably connected with the camera housing portion, actuation elements for operating the camera penetrating through the wall of the camera housing portion. One actuation element comprises a pusher arrangement for triggering the camera shutter embodying a pressure pin and a seal formed of elastomeric material which is inserted into an opening in a wall of the camera housing portion. This seal is provided with a head, a ring flange and a plug or pin elastically expansible in lengthwise direction. The plug and the ring flange extend centrally to one another, protruding from the underside of the head. A peripheral groove is provided into which extends the wall portion of the camera housing surrounding the opening, such peripheral groove being formed in the outer surface of the ring flange. A blindhole bore extends from the upper side of the head into the plug, and the pressure pin is retained in the blindhole bore.

BRIEF DESCRIPTION OF THE DRAWINGS

The invention will be better understood and objects other than those set forth above, will become apparent when consideration is given to the following detailed description thereof. Such description makes reference to the annexed drawings wherein:

FIG. 1 is a perspective view of an exemplary embodiment of camera housing wherein the closure portion is constituted by a cover;

FIG. 2 is a perspective view of an embodiment of camera housing wherein the closure portion comprises a flash bulb housing;

FIG. 3 is a cross-sectional view through a camera housing portion;

FIG. 4 is a sectional view taken substantially along the line IV—IV of FIG. 3;

FIG. 5 illustrates on an enlarged scale the portion contained within the circle marked by reference character "X" in FIG. 3;

FIG. 6 is a plan view of a cover;

FIG. 7 is a sectional view through a flash bulb housing;

FIG. 8 is a view looking in the direction of the arrow "A" of FIG. 7;

FIG. 9 is an exploded cross sectional view of a pusher or presser arrangement;

FIG. 10 is a plan view of the pressure or pressure pin; and

FIG. 11 is a perspective view of a corner portion of the camera housing with the pivot mechanism shown in exploded illustration.

DETAILED DESCRIPTION OF THE PREFERRED EMBODIMENTS

Describing now the drawings, the underwater housing H illustrated in FIGS. 1 and 2 will be seen to comprise two respective main portions or components. The first main portion comprises a camera housing portion 1. The second main portion illustrated in FIG. 1 comprises a closure portion constructed as a cover 2. The second main portion illustrated in FIG. 2 is a flash bulb housing 3. The camera housing portion 1 can be selectively connected with either only the cover 2 or the flash bulb housing portion 3, independent of the fact whether the photographic operations are carried out with or without a flash bulb. These three main components are formed of light pervious or transparent plastic such that there is present the smallest possible change in the direction or defraction of the light beams penetrating their walls, so that the photographic reproductions are not distorted. With the exemplary embodiment under discussion, there can be used, for instance, as the plastic an organic glass formed of polymethacrylate, generally known under the mark "PLEXIGLAS".

The housing composed of the main portions or components 1 and 2 or 1 and 3 respectively, is generally of quadratic configuration and specifically constructed for housing so-called pocket cameras. The activation of the shutter of such cameras is accomplished by depressing a push button which is arranged at the top of the camera and, if such push button protrudes at all, it does not extend past the top surface.

The housing of this camera is bipartite, and one part is slidable into the other i.e. telescopically arranged. The film feed occurs by pushing one part into the other, and by virtue of such movement, parts of the photographic film arranged within the camera housing are advanced by the width of a frame. The foregoing arrangement is well-known and conventional in the art.

The actuation elements for operating the camera comprise a pusher arrangement 4 for triggering the camera shutter and a pivot mechanism 5 for actuating the film feed or transport mechanism.

According to the showing of FIG. 3, the pusher arrangement 4 comprises a pressure pin 6 and a seal 7. The pressure pin 6 is inserted into the seal 7 and the seal 7 in turn is sealingly inserted into the upper housing wall 8 of the camera housing portion 1. Within the camera housing portion 1 there are formed of one piece with such camera housing portion, different ribs 9 and 10. These ribs 9 and 10 serve for guiding a camera which has been inserted into the camera housing portion 1 so that the actuation elements extending through the wall of the camera housing portion 1 are exactly aligned with appropriate operating elements of the camera.

In order to be able to receive different size cameras, the ribs 9 and 10 can be appropriately dimensioned, so that the underwater housing H can be advantageously accommodated to the shape of different pocket cameras, also those originating from different manufacturers, without having to alter the external dimensions.

At the end wall 11 of the camera housing portion 1 there is formed an eyelet 12 for receiving a ring 13, as best seen by referring to FIG. 4. A holder- or support strap can be drawn through the ring 13 and this strap or band then can be placed around the wrist of the user or his or her neck. At the open end 14 of the camera housing portion 1, the end faces of the upper housing wall 8, the lower housing wall 15 as well as both side walls 16 and 17 possess beveled sections or portions 18. Elongate groove-shaped recesses 19 are formed in the upper housing wall 8 and in the lower housing wall 15 at the region of the open end 14.

The cover 2 defining a closure portion, as illustrated in FIG. 6, will be seen to comprise a plate 20. A pin or plug 21 protrudes from this plate 20, and with the housing H assembled, this pin extends in the direction of the interior of such housing. Pin 21 serves for guiding the camera in order, as already explained, to positionally maintain the camera in the underwater housing in such a manner that the actuation elements of the underwater housing are in operative alignment with the actuation elements of the camera. Pin 21 is connected with ribs 22 by means of which it is reinforced. The pin 21 and the ribs 22 are formed of one-piece together with the plate 20.

Continuing, it will be seen that plate 20 comprises a shoulder 23. Furthermore, tongue or tab members 24 protrude from the plate 20. A number of the tongues 24 are provided with elongate raised portions or protuberances 25 which, with the cover 2 inserted into the camera housing portion 1, extend into the operatively associated elongate, groove-shaped recesses 19.

FIG. 7 illustrates a flash bulb housing 3. Such likewise is formed of transparent plastic. It possesses ribs 26 which serve to guide a flash bulb body which is a component of the pocket camera inserted into the camera housing portion 1. At the open end 27 of the flash bulb housing 3, the walls 28 of such flash bulb housing 3 are provided at their end faces with the shoulders 29. Tongues or tabs 30 protrude from the flash bulb housing 3 and at these tongues there are formed raised portions or protuberances 31. Also these raised portions 31 extend into the elongate recesses 19 of the camera housing portion 1 when the flash bulb housing 3 is inserted into such camera housing portion 1. Further, from the showing of FIG. 8 it will be apparent that these raised portions or protuberances 31 are elongate in configuration and constructed identical to the raised portions or protuberances 25 of the cover or cover member 2.

In FIG. 5 there is illustrated a cover 2 connected with the camera housing portion 1. Since the construction and dimensions of the tongues, protuberances, shoulders and so forth of the flash bulb housing 3 correspond to that of the cover or cover member 2, its limited wedge-shaped compartment is cramped. Consequently, the pressure exerted by the sealing ring upon these two surfaces increases, so that an increased sealing force counteracts the increased water pressure, as will be explained more fully hereinafter.

If the cover tongues 24 are inserted, then the flank 33 of the protuberance 25, which is beveled, abuts at the beveled portion or section 18 and therefore, during further movement, the raised portion or protuberance 25 moved downwardly along the beveled section 18, with the result that the tongue 24 is elastically, resiliently downwardly pressed.

Consequently, the tongue 24 is displaced beneath the housing wall 8. During further cover insertion, the protuberance 25 snaps into the recess 18. Now the cover 2 is locked to the camera housing portion 1. The position of each protuberance 25 and associated recess 19 is chosen such that with the cover 2 locked in place the sealing ring 32, as best seen by referring to FIG. 5, is elastically deformed and thus pre-biased i.e. exerts an adequate sealing action before the pressure of the water is effective thereat. Release of the cover 2 from the camera housing portion 1 can be accomplished by withdrawing the cover 2 away from the camera housing portion 1. Due to the force acting upon the flank 34 of the corresponding protuberance 25, the tongue 24 is pressed inwardly and therefore the protuberance 25 slides along the lower side or face of the housing wall 8.

The pusher or presser arrangement 4 with the pressure pin 6 and the seal or seal means 7 have been shown in FIG. 9 in exploded view.

The illustrated pressure pin 6 will be seen to comprise a shaft 35 and a head portion 36. In this embodiment, the head portion 36 is formed of one piece with the shaft 35 in the form of a wire loop, as best seen by referring to FIG. 10. By means of the loop there is formed a guide 100 for the tip of a finger, so that a force exerted by the finger extends extensively in the axial direction of the shaft 35. Additionally, the pusher or presser arrangement 4 must be constructed in such a way that there is prevented any unintentional release of the shutter due to static and dynamic water pressures which additionally act upon such pusher.

The seal 7 is formed of an elastomeric material. It will be seen to comprise a head 37. Extending from the underside of the head 37 is a substantially ring-shaped or annular flange 38. This ring-shaped flange 38 surrounds a plug or pin 39 which likewise protrudes from the underside of the head 37. Plug 39 and ring-shaped flange 38 extend centrally with respect to one another. The plug or pin 39 is additionally expansible in the lengthwise direction. From the top surface of the head 37 there extends a blindhole bore 40 through the head into the pin or plug 39. Further, the plug 39 has a weakened portion constructed as a substantially ring-shaped widened portion 41 of the blindhole bore 40. The diameter of the blindhole bore 40 above the ring-shaped widened portion 41 is selected such that the shaft 35 of the pressure pin 6 can slide therein, especially by virtue of the force applied by the restoring or return spring of the camera trigger upon the pusher arrangement 4 and the elasticity of the material of the seal 7.

The end of the shaft 35 of the pressure pin 6 is fixedly held in the section of the blindhole bore 40 located beneath the ring-shaped widened portion 41. Hence, the diameter of the section of the blindhole bore 40 located above the ring-shaped widened portion 41 is greater than that of the section of the blindhole bore 40 located beneath the ringshaped widened portion 41.

The jacket or outer surface 39a of the plug 39 is arranged in spaced relationship from the flank or wall 38a of the ring-shaped flange 38 which confronts such plug 39. At the outer flank or wall 38b of the ring-shaped flange 38 there is formed a peripheral groove 42 into which extends the edge of the housing wall 8 i.e. bounding wall of the opening 8a receiving the seal 7. By means of this peripheral groove 42 the housing wall 8 is sealed in watertight fashion at the pusher arrangement 4.

During assembly, the seal 7 is inserted through the opening or hole 8a formed in the upper housing wall 8. The ring-shaped flange 38, having a beveled portion 43, is pushedin and slides past the wall of the opening 8a in the upper housing wall 8. When the beveled portion 43 has moved through the opening 8a at the underside or lower face 8b of the housing wall 8, then it elastically snaps back. At the same time, the underside of the head 37 bears against the top face or surface 8a of the housing wall 8. Then, the shaft 35 of the pressure pin 6 is inserted into the blindhole bore 40 to such an extent that it contacts the floor of such blindhole bore.

It will be apparent that forces which also act laterally upon the head portion 36 of the pressure pin 6 do not bring about any reduction in the sealing action.

In order to actuate the triggering of the camera, the pressure pin 6 is depressed. Consequently, the shaft 35 slides within the blindhole bore 40 above the weakened location formed by the ring-shaped recesses 41. The shaft 35 retained at the lower portion of the blindhole bore 40 i.e. supported at the floor of the blindhole bore, now causes the plug or pin 39 to expand at the region of the ring-shaped recess 41. As a result, the end portion of the plug 39 presses against the trigger or release button or the like of the camera located directly therebelow.

In FIG. 11 there is illustrated in perspective exploded view, looking in the direction of the arrow B of FIG. 1, the pivot mechanism for actuating the film feed or transport mechanism of the camera.

The film feed mechanism of a pocket camera is conventionally actuated by carrying out a translatory movement of one part of the camera housing with respect to another part.

In FIG. 11 there is illustrated that corner region of the camera housing portion 1 where the upper housing wall 8, the end wall 11 and the side wall 16 merge with one another. Further, there are illustrated the ribs 44 formed of one piece with the upper housing wall 8 and serving for guiding the camera introduced into the camera housing portion 1.

A sleeve 45 which is formed of one piece with the camera housing portion 1 and arranged in the internal compartment 1a of the camera housing portion 1, extends substantially parallel to the upper housing wall 8 and the end wall 11 and is disposed at right angles or perpendicular to the side wall 16. The end 46 of the sleeve 45 which is located near the side wall 16 is open and the opposite end of the sleeve 45 is closed by means of an end or cover plate 47. Formed in the sleeve wall 45a is a substantially Z-shaped opening having three sections. The first section 48 extends in the axial direction of the sleeve 45. The second section 49 extends from the end of the first section 48, situated closer to the end plate 47, downwardly in the peripheral direction of the sleeve 45. The third section 50 extends from the end of the first section 48, situated closer to the side wall 16, upwardly in the peripheral direction of the sleeve 45. The second section 49 and the third section 50 thus protrude from a respective end of the first section 48 and extend in opposite peripheral directions of the sleeve or sleeve member 45.

Belonging to the movable components or parts of the pivot mechanism 5 is a rotatable shaft 51. Its diameter is chosen such that it is rotatable with minimum play in the sleeve 45. The rotatable shaft 51 possesses a peripheral groove 52. The location of the peripheral groove 52 with respect to the lengthwise axis of the rotatable shaft 51 is chosen such that with the rotatable shaft 51 inserted into the sleeve 45 it is located between the end 46 of the sleeve 45 and the third section 50 of the opening in the sleeve wall. In the peripheral groove 52 there is inserted a sealing ring 53 formed of elastomeric material.

The diameter 54 of the cross-section of the sealing ring 53 is greater than the depth 55 of the peripheral groove 52. Consequently, the sealing ring 53 which is inserted into the peripheral groove 52 protrudes past the surface of the rotatable shaft 51, and the outer diameter of the sealing ring 53 is greater than the inner diameter of the sleeve 45. With the rotatable shaft 51 inserted into the sleeve 45 the sealing ring 53 is thus elastically compressed together and prevents any entry of water along the rotatable shaft 51 into the internal compartment 1a of the camera housing portion 1.

The lengthwise extent of the rotatable shaft 51 is greater than the lengthwise extent of the inner compartment 45b of the sleeve 45. Consequently, an end or terminal section 51a of the rotatable shaft 51 protrudes past the outer surface of the side wall 16. A pivotal arm 56 is fixedly connected with this end section 51a of the rotatable shaft 51. The pivotal arm 56, in the exemplary embodiment under discussion, comprises a shaped wire element.

At the central region of the rotatable shaft 51 there is formed a bore 57 having internal threading. Threaded into this bore 57 is a thrust pin 58 having external threading. The thrust pin 58 has a head 59 which is rigidly conncted with the thrust pin 58. A slot 60 is formed at the head 59. This slot 60 serves to receive a screwdriver or other suitable or equivalent structure, by means of which the thrust pin 58 can be selectively threaded into or out of the bore 57.

If the rotatable shaft 51 together with the therewith rigidly connected pivotal arm 56 and the detachably connected thrust pin 58 are inserted into the sleeve 45, then in the rest position of the pivotal or pivot mechanism 5 the thrust pin 58 extends through the second section 49 of the Z-shaped opening in the sleeve 45. As a result, the thrust pin 58, in this rest position, extends approximately parallel to the end wall 11 through the end region 61 of the second section 49. If the pivotal arm 56 is rocked in the direction of the arrow C then the thrust pin 58 carries out a pivotal movement in the direction of the arrow D until reaching the end region 62 of the second section 49. In this position the thrust pin 58 together with the end wall 11 enclose an acute angle, in other words protrudes from the end wall. Consequently, the housing portion of a camera which bears at the head 59 of the thrust pin 58 experiences a translatory movement, and thus the film feed or transport mechanism of the camera is actuated. Since the oppositely situated end wall of the bipartitie, telescopically coacting pocket camera bears at the pin 21 of the cover or the flash bulb device at the end wall of the flash bulb housing 3, the second housing portion of the camera is stationary. In order to remove the rotatable shaft 51 from the sleeve 45, i.e. to retract the same, it will be apparent that initially the thrust pin 58 must be removed. To this end it must be threadably detached from the rotatable shaft 51 by means of a suitable tool, again for instance a screwdriver. It cannot, however, be rocked further than into the one end position where it protrudes through the end region 62 of the second section 49 where it encloses together with the end wall 11 an acute angle. In this position it is, however, not accessible by means of a tool from the open end of the camera housing portion 1. In this position of the thrust pin 58 it is possible however for the rotatable shaft 51 to be moved in the lengthwise direction, because the thrust pin 58, in this position can be moved in the first section 48 in the lengthwise direction of the rotatable shaft 51. Thus, the rotatable shaft 51 can be retracted to such an extent out of the sleeve 45 until the thrust pin 58 bears at the wall of the third section 50. In this third section 50 the thrust pin 58 can be rocked further upwards by rotating the rotatable shaft 51, so that it extends approximately parallel to the upper housing wall 8. In this position it can be screwed out of the rotatable shaft 51 by means of a screwdriver or the like so that now the rotatable shaft can be completely removed out of the sleeve 45.

Finally, it is to be remarked that the underwater housing also generally constitutes a protection for the pocket camera. For instance, it is possible to stand along a beach in the water and take a photograph without fear that the camera will be damaged by splashing or spray water or a wave which strikes the operator. Hence, there also can be taken photographs in poor weather without having to worry about snow or rain entering or wetting the camera. Equally, the camera is protected in areas where sand is present, whether it be at a beach or in the desert and there need not be feared that blown sand can enter the camera.

While there are shown and described present preferred embodiments of the invention, it is to be distinctly understood that the invention is not limited thereto, but may be otherwise variously embodied and practiced within the scope of the following claims. ACCORDINGLY,

What is claimed is:

1. An underwater housing for a photographic camera, comprising:
   a camera housing portion;
   a closure portion detachably connected with the camera housing portion;
   said camera housing portion having wall means;
   actuation elements for operating the camera penetrating through the wall means of the camera housing portion;
   one of the actuation elements comprising a presser arrangement for triggering a camera shutter;
   said presser arrangement comprising a pressure pin and a seal formed of elastomeric material;
   said camera housing portion having an opening receiving said seal;
   said seal comprising a head, a substantially ring-shaped flange and a plug elastically expansible in lengthwise direction;
   said plug and said ring-shaped flange extending substantially centrally with respect to one another and protruding from the underside of said head;
   said ring-shaped flange having an outer surface containing a peripheral groove;
   a wall portion of the camera housing portion surrounding said opening extending into the peripheral groove;
   means providing a blindhole bore extending through the plug from the top of the head;
   said pressure pin being held in the blindhole bore.

2. The underwater housing as defined in claim 1, wherein:
   said plug is constructed to provide a weakened portion;
   said weakened portion subdividing the blindhole bore into a guide section and an end section;
   said guide section being arranged at the side of the weakened portion directed towards said head;
   said pressure pin being guided in the guide section and retained in the end section.

3. The underwater housing as defined in claim 2, wherein the weakened portion comprises a substantially ring-shaped groove.

4. The underwater housing as defined in claim 1, wherein:
   another of said actuation elements comprises a pivot mechanism for actuating a film transport mechanism of the camera;
   said pivot mechanism comprising a pivotal arm, a rotatable shaft and a thrust pin;
   said camera housing portion including a sleeve formed of one piece with said camera housing portion;
   means for rotatably and lengthwise displaceably mounting the rotatable shaft in said sleeve such that an end portion of the rotatable shaft protrudes outwardly of the camera housing portion;
   said pivotable arm being connected with said end portion of the rotatable shaft;
   part of the rotatable shaft being located in said sleeve;
   said thrust pin being connected with said part of the rotatable shaft located in said sleeve;
   said sleeve having an opening;
   said thrust pin extending through said opening of the sleeve into an internal compartment of the camera housing portion.

5. The underwater housing as defined in claim 4, wherein:
   said rotatable shaft includes a peripheral groove;
   a sealing ring located at an inner wall of the sleeve arranged in said peripheral groove;
   the thrust pin being detachably connected with the rotatable shaft.

6. The underwater housing as defined in claim 5, wherein:
   said thrust pin possesses a head portion connected therewith and formed of elastomeric material.

7. The underwater housing as defined in claim 6, wherein:
   said thrust pin is threadably connected with rotatable shaft;
   said head portion having a slot for manipulating the thrust pin by means of a tool.

8. The underwater housing as defined in claim 4, wherein:
said mounting means for said rotatable shaft comprises said sleeve having an opening in its wall which possesses a substantially Z-shaped configuration and includes three sections defining first, second and third sections;
said first section extending in the axial direction of the sleeve;
said second section and said third section each extending oppositely with respect to one another in the peripheral direction of the sleeve from a respective end of the first section.

9. The underwater housing as defined in claim 8, wherein:
said rotatable shaft is displaceable between two terminal positions in axial direction by means of the thrust pin extending through the first section;
the thrust pin in a first terminal position being pivotable in the second section and in a second terminal position being pivotable in the third section.

10. The underwater housing as defined in claim 9, wherein:
said thrust pin is pivotable in the second section from a rest position in which it extends approximately parallel to an end wall of the camera housing portion into a work position in which it encloses with such end wall an acute angle for actuating the film transport mechanism.

11. The underwater housing as defined in claim 10, wherein:
said thrust pin is pivotable in the third section from a position where it encloses an acute angle with said end wall of the camera housing portion into a further position where it extends approximately perpendicular to such end wall, and in which further position said thrust pin can be disconnected from the rotatable shaft.

12. The underwater housing as defined in claim 1, wherein the closure portion comprises a cover.

13. The underwater housing as defined in claim 12, further including:
a pin protruding from the cover for supporting the camera.

14. The underwater housing as defined in claim 1, wherein:
the closure portion comprises a flash bulb housing.

15. The underwater housing as defined in claim 14, further including:
rib means for guiding the camera arranged in the camera housing portion and the flash bulb portion.

16. The underwater housing as defined in claim 1, further including:
plug connection means for interconnecting the closure portion and the camera housing portion with one another.

17. The underwater housing as defined in claim 16, wherein:
said plug connection means comprises a number of resilient tongues;
at least one tongue possessing a locking portion engaging with a counter element.

18. The underwater housing as defined in claim 17, wherein:
said tongues are connected with the closure portion and extend away therefrom into the camera housing portion.

19. The underwater housing as defined in claim 18, wherein:
each locking portion includes a protuberance formed at the tongue;
said protuberance extending into a recess provided at the camera housing portion.

20. The underwater housing as defined in claim 18, further including:
a sealing ring formed of elastomeric material arranged between the camera housing portion and the closure portion;
said closure portion possessing shoulder means at the base of the tongues;
said camera housing portion possessing a sealing surface;
the surface of the shoulder means enclosing an angle with the surface of the sealing surface;
said sealing ring being arranged between the shoulder means, the tongues and the sealing surface and being elastically deformed.

21. The underwater housing as defined in claim 17, wherein:
the tongues are connected with the camera housing portion and extend away therefrom into the closure portion.

22. The underwater housing as defined in claim 21, wherein:
each locking portion comprises a protuberance provided at the tongue;
said protuberance extending into a recess of the closure portion.

23. The underwater housing as defined in claim 21, further including:
a sealing ring formed of elastomeric material arranged between the camera housing portion and the closure portion;
said camera housing portion being provided with shoulder means at the base of the tongues;
the closure portion possessing a sealing surface;
the surface of the shoulder means enclosing together with the surface of the sealing surface an angle;
said sealing ring being arranged between the shoulder means, the tongues and the sealing surface and being elastically deformable.

24. The underwater housing as defined in claim 16, further including:
a sealing ring formed of elastomeric material arranged between the camera housing portion and the closure portion.

25. The underwater housing as defined in claim 1, wherein:
said camera housing portion and said closure portion are each formed of transparent plastic.

26. The underwater housing as defined in claim 25, wherein:
both the camera housing portion and the closure portion are formed of organic glass.

27. The underwater housing as defined in claim 26, wherein:
said organic glass is polymethacrylate.

* * * * *